US012245983B2

(12) United States Patent
Chapman et al.

(10) Patent No.: US 12,245,983 B2
(45) Date of Patent: Mar. 11, 2025

(54) CARDIO-PULMONARY RESUSCITATION DEVICE FOR COMPRESSING AND DECOMPRESSING THE CHEST OF A PATIENT

(71) Applicant: PHYSIO-CONTROL, INC., Redmond, WA (US)

(72) Inventors: Fred W. Chapman, Newcastle, WA (US); Gregory T. Kavounas, Bellevue, WA (US)

(73) Assignee: PHYSIO-CONTROL, INC., Redmond, WA (US)

( * ) Notice: Subject to any disclaimer, the term of this patent is extended or adjusted under 35 U.S.C. 154(b) by 1194 days.

(21) Appl. No.: 16/902,027

(22) Filed: Jun. 15, 2020

(65) Prior Publication Data

US 2020/0306133 A1 Oct. 1, 2020

Related U.S. Application Data

(60) Continuation of application No. 15/892,374, filed on Feb. 8, 2018, now Pat. No. 10,702,449, which is a
(Continued)

(51) Int. Cl.
*A61H 31/00* (2006.01)

(52) U.S. Cl.
CPC .......... *A61H 31/00* (2013.01); *A61H 31/005* (2013.01); *A61H 31/006* (2013.01);
(Continued)

(58) Field of Classification Search
CPC .... A61H 31/00; A61H 31/004; A61H 31/005; A61H 31/006; A61H 31/008;
(Continued)

(56) References Cited

U.S. PATENT DOCUMENTS 2,071,215 A 2/1937 Petersen
3,425,409 A 2/1969 Isaacson et al.
(Continued)

FOREIGN PATENT DOCUMENTS

WO 2006039166 A2 4/2006
WO WO-2010004499 A1 * 1/2010 .......... A61H 31/004
WO 2014051934 A1 4/2014

OTHER PUBLICATIONS

English translation of Sebelius (SE 521141 C2) (Year: 2001).*
(Continued)

*Primary Examiner* — Justine R Yu
*Assistant Examiner* — Christopher E Miller
(74) *Attorney, Agent, or Firm* — Miller Nash LLP

(57) ABSTRACT

A CPR chest compression machine includes a retention structure that is configured to retain a body of the patient, and a compression mechanism. The compression mechanism is coupled to the retention structure and configured to perform successive compressions to the patient's chest. Various types of chest compressions may be performed on a patient during a single resuscitation event. Some embodiments also include a driver configured to drive the compression mechanism. The compression mechanism may thus perform chest compressions that differ from each other in a number of aspects, for example the depth of the compressions or the height of the active decompressions between the compressions. Some embodiments also include an adjustment mechanism. The adjustment mechanism may shift the compression mechanism with respect to the patient so that the chest compressions are performed at different locations of the patient's chest.

17 Claims, 8 Drawing Sheets

CHANGING HEIGHT OF ACTIVE DECOMPRESSIONS

Related U.S. Application Data division of application No. 14/273,593, filed on May 9, 2014, now abandoned.

(60) Provisional application No. 61/822,234, filed on May 10, 2013.

(52) U.S. Cl.
CPC ..... *A61H 31/007* (2013.01); *A61H 2230/045* (2013.01); *A61H 2230/065* (2013.01); *A61H 2230/208* (2013.01); *A61H 2230/305* (2013.01); *A61H 2230/425* (2013.01)

(58) Field of Classification Search
CPC ........ A61H 2031/001; A61H 2031/002; A61H 2031/003
See application file for complete search history.

(56) References Cited

U.S. PATENT DOCUMENTS

| | | | | |
|---|---|---|---|---|
| 3,782,371 | A | 1/1974 | Derouineau | |
| 4,233,980 | A | 11/1980 | McRae et al. | |
| 5,261,394 | A | 11/1993 | Mulligan et al. | |
| 5,490,820 | A | 2/1996 | Schock et al. | |
| 5,575,027 | A | 11/1996 | Mueller | |
| 5,630,789 | A | 5/1997 | Schock et al. | |
| 6,290,660 | B1 | 9/2001 | Epps et al. | |
| 7,569,021 | B2 | 8/2009 | Sebelius et al. | |
| 8,795,208 | B2 | 8/2014 | Walker | |
| 9,724,266 | B2 | 8/2017 | Voss et al. | |
| 10,143,619 | B2 | 12/2018 | Chapman et al. | |
| 2003/0181834 | A1 | 9/2003 | Sebelius et al. | |
| 2004/0162587 | A1 | 8/2004 | Hampton et al. | |
| 2004/0181179 | A1 | 9/2004 | Hwang | |
| 2006/0094991 | A1 | 5/2006 | Walker | |
| 2007/0093731 | A1 | 4/2007 | Warwick et al. | |
| 2007/0270724 | A1 | 11/2007 | Havardsholm et al. | |
| 2008/0097261 | A1 | 4/2008 | Hansen et al. | |
| 2009/0020129 | A1 | 1/2009 | Shaffer et al. | |
| 2009/0187123 | A1 | 7/2009 | Hwang et al. | |
| 2010/0185127 | A1 | 7/2010 | Nilsson et al. | |
| 2010/0198118 | A1 | 8/2010 | Itnati | |
| 2011/0092864 | A1 | 4/2011 | Woerlee et al. | |
| 2011/0201979 | A1 | 8/2011 | Voss et al. | |
| 2011/0301513 | A1* | 12/2011 | Freeman .............. | A61H 31/007 600/509 |
| 2012/0016179 | A1* | 1/2012 | Paradis ................ | A61H 9/0078 601/41 |
| 2012/0016279 | A1 | 1/2012 | Banville et al. | |
| 2012/0203147 | A1 | 8/2012 | Lurie et al. | |
| 2012/0238922 | A1 | 9/2012 | Stemple et al. | |
| 2012/0330199 | A1 | 12/2012 | Lurie et al. | |
| 2012/0330200 | A1 | 12/2012 | Lurie et al. | |
| 2013/0030333 | A1 | 1/2013 | Cicenas et al. | |
| 2013/0218056 | A1 | 8/2013 | Aelen et al. | |
| 2013/0338550 | A1 | 12/2013 | Faller et al. | |
| 2014/0066822 | A1 | 3/2014 | Freeman | |
| 2014/0088467 | A1 | 3/2014 | Parascandola et al. | |
| 2014/0100496 | A1 | 4/2014 | Johnson et al. | |
| 2014/0180180 | A1* | 6/2014 | Nilsson ................ | A61H 31/006 601/41 |
| 2014/0221882 | A1 | 8/2014 | Jeppsson | |
| 2015/0272822 | A1 | 10/2015 | Wik et al. | |
| 2016/0143804 | A1 | 5/2016 | Nilsson et al. | |

OTHER PUBLICATIONS

Eric Qvistad, Clinical pilot study of different hand positions during manual chest compressions monitored with capnography, Resuscitation, 2013, 1203-1207, 84 (2013), Elsevier.

PCT Correspondence: Invitation to Pay Additional Fees in International Application No. PCT/US14/37419, mailed Sep. 18, 2014.

* cited by examiner

COMPONENTS OF CPR
CHEST COMPRESSION MACHINE

CHANGING MODES

SERIES OF COMPRESSIONS WITH VARYING DEPTHS

METHODS

CHANGING HEIGHT OF ACTIVE DECOMPRESSIONS

600

610 PERFORM FIRST DECOMPRESSION AT FIRST HEIGHT

↓

620 PERFORM SECOND DECOMPRESSION AT SECOND HEIGHT

↓

630 PERFORM THIRD DECOMPRESSION AT THIRD HEIGHT

*METHODS*

*CPR MACHINE COMPRESSING CHEST AT DIFFERENT SITES*

PATIENT IN FIRST POSITION

PATIENT IN SECOND POSITION

*CONTACT MEMBER IN FIRST POSITION*

*CONTACT MEMBER IN SECOND POSITION*

COMPRESSION MECHANISM IN FIRST POSITION

COMPRESSION MECHANISM IN SECOND POSITION

*METHODS*

CARDIO-PULMONARY RESUSCITATION DEVICE FOR COMPRESSING AND DECOMPRESSING THE CHEST OF A PATIENT

CROSS REFERENCE TO RELATED PATENT APPLICATIONS

This patent application is a continuation of U.S. patent application Ser. No. 15/892,374 filed on Feb. 8, 2018, which is a divisional of U.S. patent application Ser. No. 14/273,593 filed on May 9, 2014, which claims priority from U.S. Provisional Patent Application Ser. No. 61/822,234, filed on May 10, 2013, the disclosures of which are hereby incorporated by reference for all purposes.

BACKGROUND

In certain types of medical emergencies a patient's heart stops working. This stops the blood flow, without which the patient may die. Cardio Pulmonary Resuscitation (CPR) can forestall the risk of death. CPR includes performing repeated chest compressions to the chest of the patient so as to cause their blood to circulate some. CPR also includes delivering rescue breaths to the patient. CPR is intended to merely maintain the patient until a more definite therapy is made available, such as defibrillation. Defibrillation is an electrical shock deliberately delivered to a person in the hope of correcting their heart rhythm.

The repeated chest compressions of CPR are actually compressions alternating with releases. They cause the blood to circulate some, which can prevent damage to organs like the brain. For making this blood circulation effective, guidelines by medical experts such as the American Heart Association dictate suggested parameters for chest compressions, such as the frequency, the depth reached, fully releasing after a compression, and so on. The releases are also called decompressions.

Traditionally, CPR has been performed manually. A number of people have been trained in CPR, including some who are not in the medical professions just in case. However, manual CPR might be ineffective, and being ineffective it may lead to irreversible damage to the patient's vital organs, such as the brain and the heart. The rescuer at the moment might not be able to recall their training, especially under the stress of the moment. And even the best trained rescuer can become quickly fatigued from performing chest compressions, at which point their performance might be degraded. Indeed, chest compressions that are not frequent enough, not deep enough, or not followed by a full decompression may fail to maintain blood circulation.

The risk of ineffective chest compressions has been addressed with CPR chest compression machines. Such machines have been known by a number of names, for example CPR chest compression machines, mechanical CPR devices, cardiac compressors and so on.

CPR chest compression machines repeatedly compress and release the chest of the patient. Such machines can be programmed so that they will automatically compress and release at the recommended rate or frequency, and can reach a specific depth within the recommended range. Some of these machines can even exert force upwards during decompressions. Sometimes the feature can even pull the chest higher than it would be while at rest—a feature that is called active decompression.

At present, most CPR chest compression machines repeat the same type of compressions over and over, pressing each time at the same location of the patient chest. This precise consistency is non-physiologic and may miss an opportunity to better move blood through each part of the patient's circulatory systems.

BRIEF SUMMARY

The present description gives instances of CPR chest compression machines, software and methods, the use of which may help overcome problems and limitations of the prior art.

In embodiments a CPR chest compression machine includes a retention structure that is configured to retain a body of the patient, and a compression mechanism. The compression mechanism is coupled to the retention structure and configured to perform successive compressions to the patient's chest. Various types of chest compressions may be performed on a patient during a single resuscitation event.

Some embodiments also include a driver configured to drive the compression mechanism. The compression mechanism may thus perform chest compressions that differ from each other in a number of aspects, for example the depth of the compressions or the height of the active decompressions between the compressions.

Some embodiments also include an adjustment mechanism. The adjustment mechanism may shift the compression mechanism with respect to the patient so that the chest compressions are performed at different locations of the patient's chest.

An advantage over the prior art can be improved blood flow and thus improved CPR patient outcomes. For example, blood flow may be optimized for one side of the patient's heart, then the other.

These and other features and advantages of this description will become more readily apparent from the Detailed Description, which proceeds with reference to the associated drawings in which:

DETAILED DESCRIPTION

As has been mentioned, the present description is about CPR chest compression machines, methods and software that can perform automatically a series of Cardio-Pulmonary Resuscitation ("CPR") chest compressions on a patient. Embodiments are now described in more detail.

Figure 1:
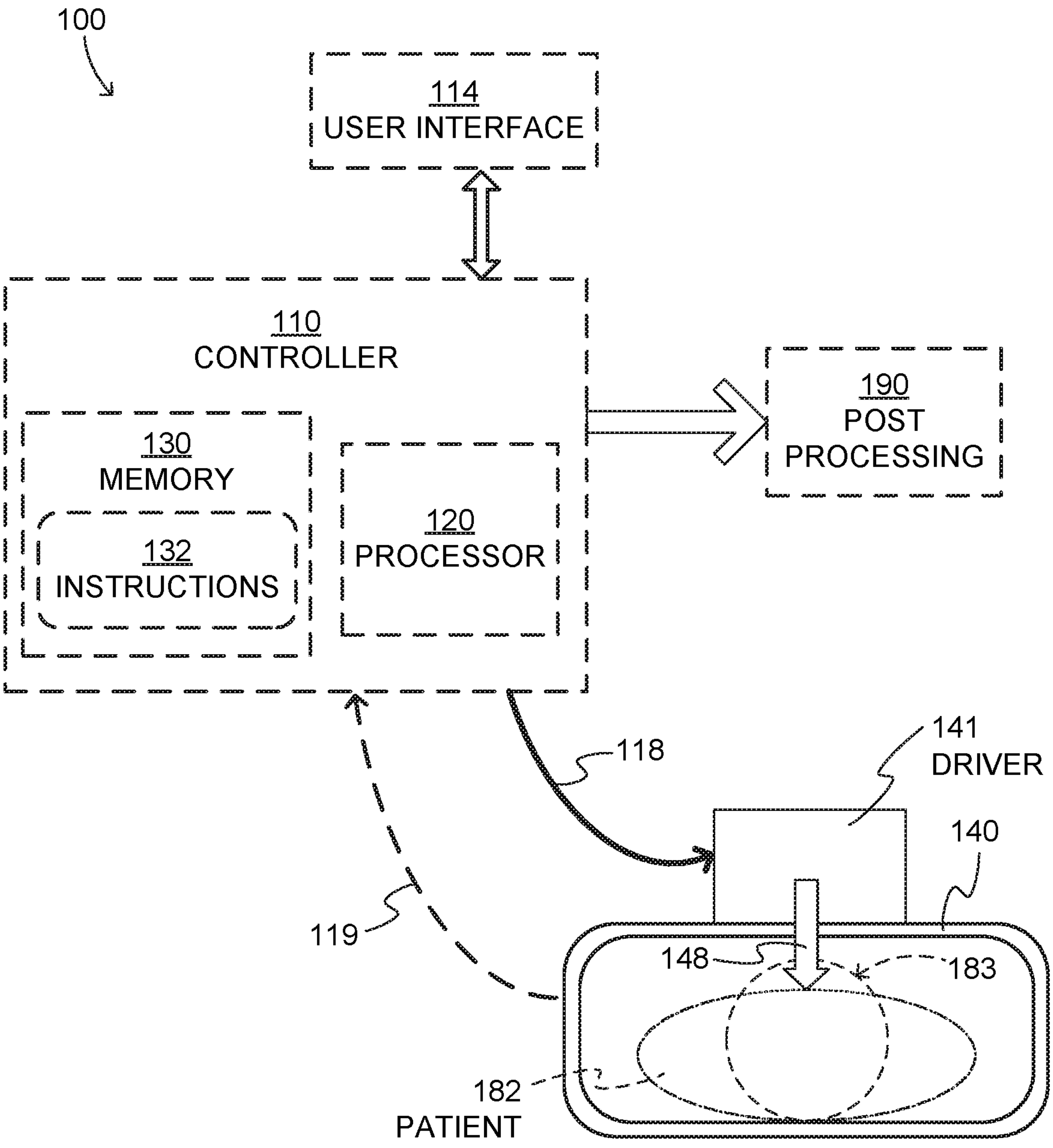
FIG. 1 is a diagram of components of an abstracted CPR chest compression machine according to embodiments.

FIG. 1 is a diagram of components 100 of an abstracted CPR chest compression machine according to embodiments. Components 100 include an abstracted retention structure 140 of a CPR chest compression machine. A patient 182 is placed within retention structure 140. Retention structure 140 retains the patient's body, and may be implemented in any number of ways. Good embodiments are disclosed in U.S. Pat. No. 7,569,021 to Jolife A B which is incorporated by reference; these embodiments and are being sold by Physio-Control, Inc. under the trademark LUCAS®. In other embodiments retention structure 140 includes a belt that can be placed around the patient's chest. While retention structure 140 typically reaches the chest and the back of patient 182, it does not reach the head 183.

Components 100 also include a compression mechanism 148 configured to perform successive compressions to a chest of the patient, and a driver 141 configured to drive compression mechanism 148 so as to cause compression mechanism 148 to perform successive compressions to the patient's chest. Compression mechanism 148 and driver 141 may be implemented in combination with retention structure 140 in any number of ways. In the above mentioned example of U.S. Pat. No. 7,569,021 compression mechanism 148 includes a piston, and driver 141 includes a rack-and-pinion mechanism. In embodiments where retention structure 140 includes a belt, compression mechanism 148 may include a spool for collecting and releasing the belt so as to squeeze and release the patient's chest, and driver 141 can include a motor for driving the spool.

Driver 141 may be controlled by a controller 110 according to embodiments. Controller 110 may be coupled with a User Interface 114, for receiving user instructions, and for outputting data.

Controller 110 may include a processor 120. Processor 120 can be implemented in any number of ways, such as with a microprocessor, Application Specific Integration Circuits (ASICs), programmable logic circuits, general processors, etc. While a specific use is described for processor 120, it will be understood that processor 120 can either be standalone for this specific use, or also perform other acts.

In some embodiments controller 110 additionally includes a memory 130 coupled with processor 120. Memory 130 can be implemented by one or more memory chips. Memory 130 can be a non-transitory storage medium that stores instructions 132 in the form of programs. Instructions 132 can be configured to be read by processor 120, and executed upon reading. Executing is performed by physical manipulations of physical quantities, and may result in functions, processes, actions and/or methods to be performed, and/or processor 120 to cause other devices or components to perform such functions, processes, actions and/or methods. Often, for the sake of convenience only, it is preferred to implement and describe a program as various interconnected distinct software modules or features, individually and collectively also known as software. This is not necessary, however, and there may be cases where modules are equivalently aggregated into a single program, even with unclear boundaries. In some instances, software is combined with hardware in a mix called firmware.

While one or more specific uses are described for memory 130, it will be understood that memory 130 can further hold additional data, such as event data, patient data, and so on. For example, data gathered according to embodiments could be aggregated in a database over a period of months or years and used to search for evidence that one pattern or another of CPR is consistently better (in terms of a measured parameter) than the others, of course correlating with the patient. If so, this could be used to adapt the devices to use that pattern either continuously or at least as one of their operating modes.

Controller 110 can be configured to control driver 141 according to embodiments. Controlling is indicated by arrow 118, and can be implemented by wired or wireless signals and so on. Accordingly, compressions can be performed on the chest of patient 182 as controlled by controller 110. In embodiments, the compressions are performed automatically in one or more series, and perhaps with pauses between them as described below, as controlled by controller 110. A single resuscitation event can be a single series of compressions for the same patient, or a number of series thus performed sequentially.

Controller 110 may be implemented together with retention structure 140, in a single CPR chest compression machine. In such embodiments, arrow 118 is internal to such a CPR chest compression machine. Alternately, controller 110 may be hosted by a different machine, which communicates with the CPR chest compression machine that uses retention structure 140. Such communication can be wired or wireless. The different machine can be any kind of device, such as a medical device. One such example is described in U.S. Pat. No. 7,308,304, titled "COOPERATING DEFIBRILLATORS AND EXTERNAL CHEST COMPRESSION MACHINES", only the description of which is incorporated by reference. Similarly, User Interface 114 may be implemented on the CPR chest compression machine, or on a host device.

Figure 2:
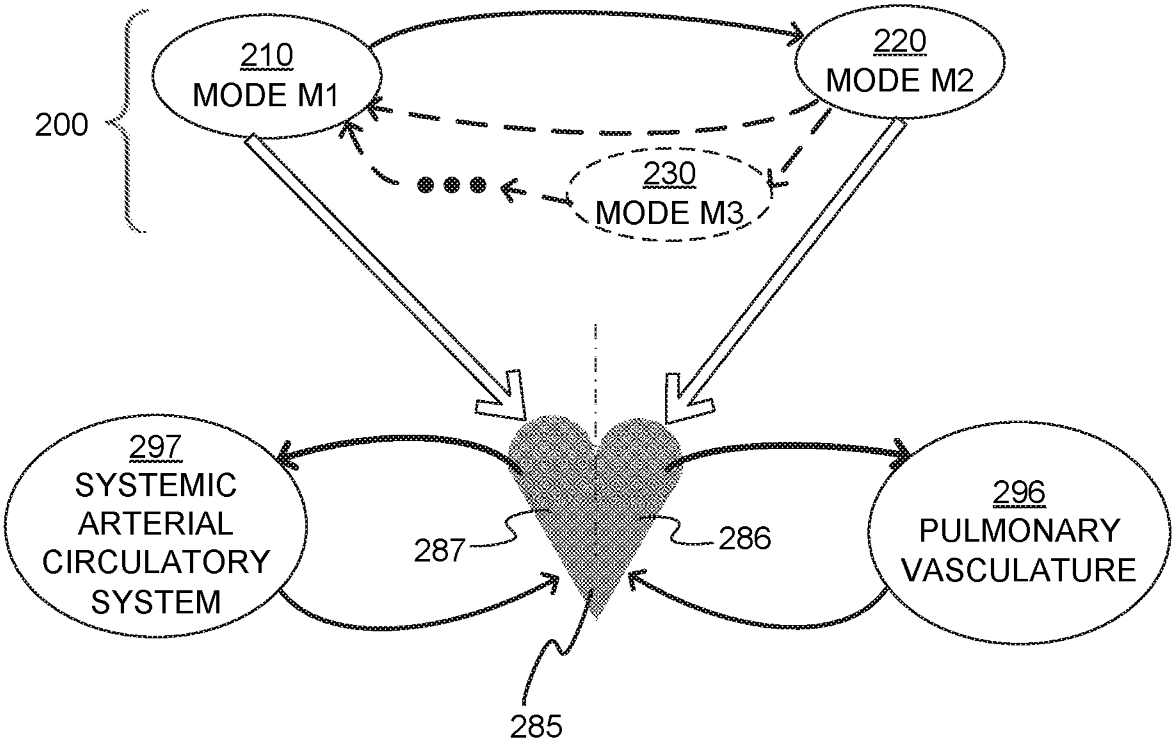
FIG. 2 is a diagram of a state machine for a CPR chest compression machine changing modes according to embodiments, and further illustrating embodiments where some of the individual modes can be adjusted for optimizing blood flow in different parts of the patient's circulatory system.

FIG. 2 is a diagram of a state machine 200 for a CPR chest compression machine according to embodiments. State machine 200 is a representation of different modes in which a CPR chest machine can perform chest compressions. State machine 200 includes a state 210 during which chest compressions are performed according to a mode M1, a state 220 during which chest compressions are performed according to a mode M2, optionally a state 230 during which chest compressions are performed according to a mode M3, and so on. Modes M1, M2, M3 can be different in that one or more of the chest compressions performed during these modes can be different in one mode than the other, as will be seen in more detail below.

So, according to state machine 200, operations of a CPR chest compression machine according to embodiments can include one or more compressions according to mode M1, then one or more compressions according to mode M2, then one or more compressions according to mode M3 and so on. In some embodiments where there are only two states 210, 220, execution may alternate between them. When there are three or more states, execution may or may not return to state 210. When execution alternates or transitions between two modes, it can do so with or without a pause.

In many embodiments, one or more of the modes can be adjusted for optimizing blood flow into one or more of the different parts of the patient's circulatory system. More particularly, the patient's circulatory system has two main parts, namely the pulmonary vasculature 296 and the systemic arterial circulatory system 297. The heart 285 of a patient is shown with a dot-dash line dividing it into the right side 286 ("right heart 286") and the left side 287 ("left heart 287"). Right heart 286 pumps blood into pulmonary vasculature 296, where it becomes oxygenated by the lungs while carbon dioxide is removed. The oxygenated blood is then received back in heart 285. Left heart 287 then pumps the oxygenated blood into systemic arterial circulatory system 297 via the arteries. The blood is then received back in the heart via the veins. The two parts of the patient's circulatory system are mechanically different, and therefore have different hemodynamics for the purpose of pumping. For example, pulmonary vasculature 296 is more distensible than systemic arterial circulatory system 297. Moreover, the operations of each part of the patient's circulatory system are different.

In these embodiments, as further indicated by large arrows in FIG. 2, mode M1 of chest compressions may be optimized to assist the pumping operation of left heart 287, while mode M2 may be optimized to assist the pumping operation of right heart 286. In some of these embodiments, state machine 200 dwells on state 220 for some time so that, due to the compressions being according to mode M2, the blood will preferentially accumulate in the lungs where it can become more thoroughly oxygenated, and then state machine 200 can return to state 210 for some time so that, due to the compressions being according to mode M1, the blood will preferentially be pumped into systemic arterial circulatory system 297. This approach may improve CPR blood flow and/or its life-sustaining effects above what either type of compression would provide by itself. The left atrium, which is fairly distensible/compliant, can also potentially serve as a reservoir to accumulate blood during times when the mode favors pumping blood out of the right side of the heart. And then when switching to the mode favoring ejection of blood out of the left heart into the systemic circulation, the left side of the heart is primed full of blood to be pushed out to the systemic circulation.

The invention addresses the fact that, for CPR to successfully sustain a patient in arrest and ultimately lead to return of the patient to neuro-intact life, we believe that CPR must provide at least some minimal amount of blood flow to the brain and also to the heart itself (via the coronary arteries). The properties of the vasculatures in those two organs differ, and there is no particular reason to think that the same CPR pattern would lead to optimal flow to both organs. Therefore, embodiments alternate between modes, which may result in each organ receiving a burst of good blood flow periodically.

As mentioned above, modes M1, M2, . . . can be different in that one or more of the chest compressions performed during these modes can be different. The chest compressions can be different in one or more ways that include chest compression depth, the height of active decompression, the chest compressions being performed at different locations of the body, ventilation related parameters, time parameters such as the frequency or rate and the duty ratio as described in co-pending U.S. patent application Ser. No. 14/271,660, which is hereby incorporated by reference. Examples are now given.

In embodiments, the driver is configured to drive the compression mechanism so as to cause the compression mechanism to perform to the patient's chest various chest compressions. A first one of the compressions can be at a first depth, then a second one of the compressions can be at a second depth at least 10% deeper than the first depth, and then a third one of the compressions can be at a third depth at least 10% shallower than the second depth. An example is now described.

Figure 3:
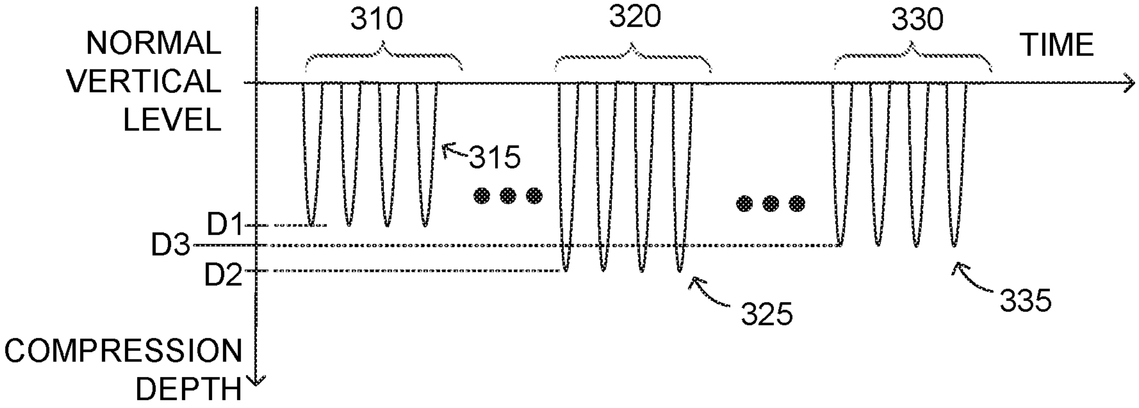
FIG. 3 is a time diagram illustrating an example of chest compressions where the depth is changing according to embodiments.

FIG. 3 is a time diagram of selected chest compressions in a series of chest compressions that are performed during a single resuscitation event during time ranges 310, 320, 330 according to embodiments. The compressions in this example include alternating decompressions that are not shown. These compressions in this example are indicated as excursions that start from a normal vertical level, move down, and then return up to the same level. The normal vertical level is where the chest is when not touched by the machine.

In time range 310 compressions 315 can include the first compression mentioned above and are performed at a first depth D1, measured downwards from the normal vertical level. In time range 320 compressions 325 can include the second compression mentioned above and are performed at a second depth D2. In time range 330 compressions 335 can include the third compression mentioned above and are performed at a third depth D3.

It will be appreciated that second depth D2 is at least 10% deeper than first depth D1, and it could be even deeper, for example 15% or more than first depth D1. Additionally, third depth D3 is at least 10% shallower than second depth D2, and it could be even shallower, for example 15% or more than second depth D2. In this case third depth D3 is not the same as first depth D1, which corresponds to having at least three states in a state machine, and thus at least three modes. Alternately, if the third depth were the same as the first depth, that could correspond to having only two states in the state machine and thus only two modes.

In one embodiment, the compression depth could alternate between a standard depth (for example 2 inches) and a greater depth (say 2.5 inches). In a series of compressions, after a run of standard depth compressions, the depth would be increased for a period of time, for example for 10 seconds, and then returned to the standard depth for a period of time, for example 10 seconds. In a similar embodiment, the depth could alternate between periods of a lesser depth (for example, 1.5 inches) and a greater depth (for example 2.5 inches). Experiments would be needed to figure out the optimal timing and depths.

The diagram of FIG. 3 speaks only to the compressions, but not to any active decompressions. The latter can be performed independently of the former, as will be seen below.

The devices and/or systems made according to embodiments perform functions, processes and/or methods, as described in this document. These functions, processes and/or methods may be implemented by one or more devices that include logic circuitry, such as was described for controller 110.

Moreover, methods and algorithms are described below. This detailed description also includes flowcharts, display images, algorithms, and symbolic representations of program operations within at least one computer readable medium. An economy is achieved in that a single set of flowcharts is used to describe both programs, and also methods. So, while flowcharts describe methods in terms of boxes, they also concurrently describe programs. A method is now described.

Figure 4:
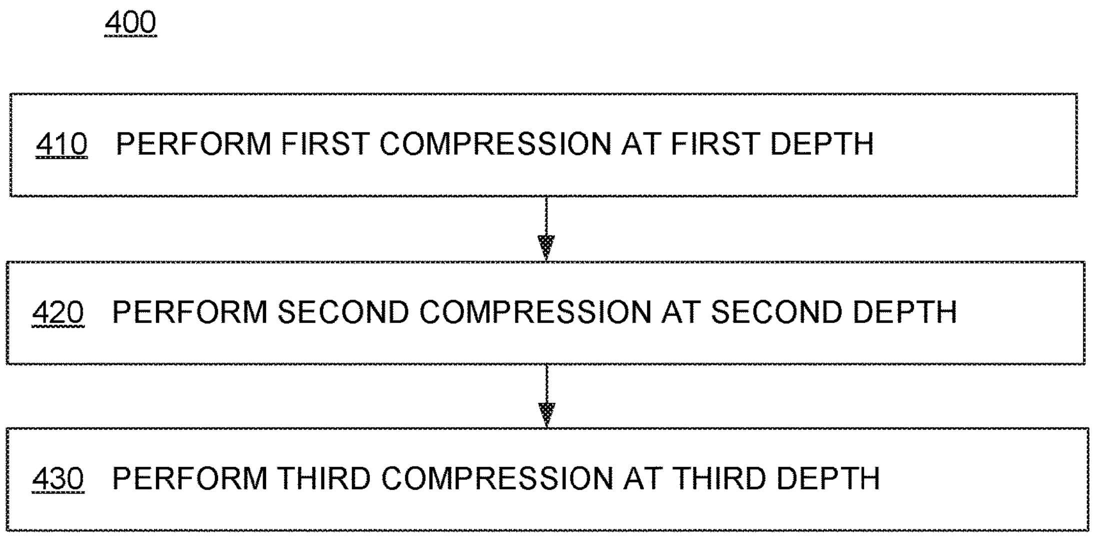
FIG. 4 is a flowchart illustrating methods according to embodiments.

FIG. 4 shows a flowchart 400 for describing methods according to embodiments. The methods of flowchart 400 may also be practiced by embodiments described elsewhere in this document for performing automatically a series of successive compressions to a chest of a patient.

According to an operation 410, a first one of the compressions in the series is performed at a first depth.

According to another operation 420, a second one of the compressions in the series is performed at a second depth that is at least 10% deeper than the first depth.

According to another operation 430, a third one of the compressions in the series is performed at a third depth at least 10% shallower than the second depth. The relationships between the depths can be as described above.

Referring back to FIG. 2, another way that compressions could differ between different modes according to embodiments is according to a height reached during active decompressions. More particularly, and as mentioned previously, the normal vertical level is where the chest is when not touched by the machine. Compressions are defined downwards from this level, while active decompressions are defined upwards from it. The compression mechanism can be configured to perform to the chest successive compressions below the normal level, and decompressions alternating with the compressions. The decompressions are active decompressions if they lift the chest above the normal vertical level. In some embodiments, active decompressions are accomplished by a CPR machine having a suction cup.

In some embodiments, therefore, the driver is configured to drive the compression mechanism so as to cause the compression mechanism to perform decompressions reaching different heights above the normal vertical level. The height reached is directly related to the decompression force applied, so different heights are reached by applying different decompression forces. A first one of the decompressions can reach a first height above the normal vertical level, then a second one of the decompressions can reach a second height that is less than 80% of the first height above the normal vertical level, and then a third one of the decompressions can reach a third height that is at least as high as the first height above the normal vertical level.

Figure 5:
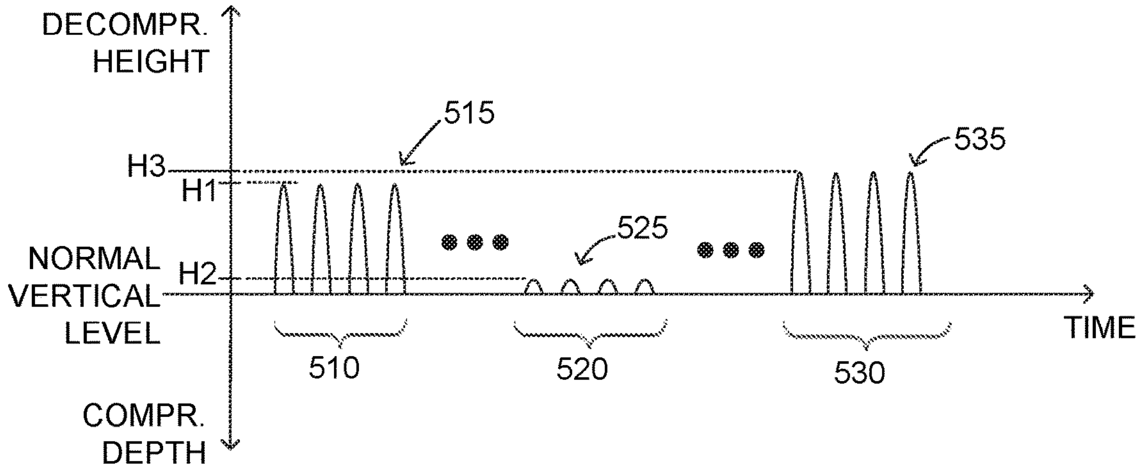
FIG. 5 is a time diagram illustrating an example of chest decompressions where the height of active decompressions is changing according to embodiments.

FIG. 5 is a time diagram of selected chest decompressions in a series of chest compressions alternating with decompressions that are performed during a single resuscitation event during time ranges 510, 520, 530 according to embodiments. The decompressions in this example include alternating compressions that are not shown. The decompressions are indicated as excursions that start from a normal vertical level after a compression, move up, and then return up to the normal vertical level for starting the next compression.

In time range 510 decompressions 515 can include the first compression mentioned above and are performed at a first height H1, measured upwards from the normal vertical level. In time range 520 decompressions 525 can include the second compression mentioned above and are performed at a second height H2. In time range 530 decompressions 535 can include the third compression mentioned above and are performed at a third height H3.

It will be appreciated that second height H2 is less than 80% of first height H1, as measured above the normal vertical level. Moreover, second height H2 can be less than 30% of first height H1. In fact, second height H2 can be substantially zero above the normal vertical level, meaning that the decompression is not an active decompression at all.

Additionally, third height H3 is at least as high as first height H1 above the normal vertical level. In this case third height H3 is not the same as first height H1, which corresponds to having at least three states in a state machine, and thus at least three modes. Alternately, if the third height H3 were the same as the first height, that could correspond to having only two states in the state machine and thus only two modes.

Accordingly, the compressions could change between the modes in the amount of decompression force applied. In embodiments, the compressions could be delivered while alternating between applying decompression force to the chest between compressions, and not applying decompression force to the chest between compressions. Experiments would be needed to figure out the optimal force, resulting in optimal heights.

The diagram of FIG. 5 speaks only to the decompressions, but not to any of the compressions between the decompressions. The former can be performed independently of the latter, as was seen above.

Figures 6, 7:
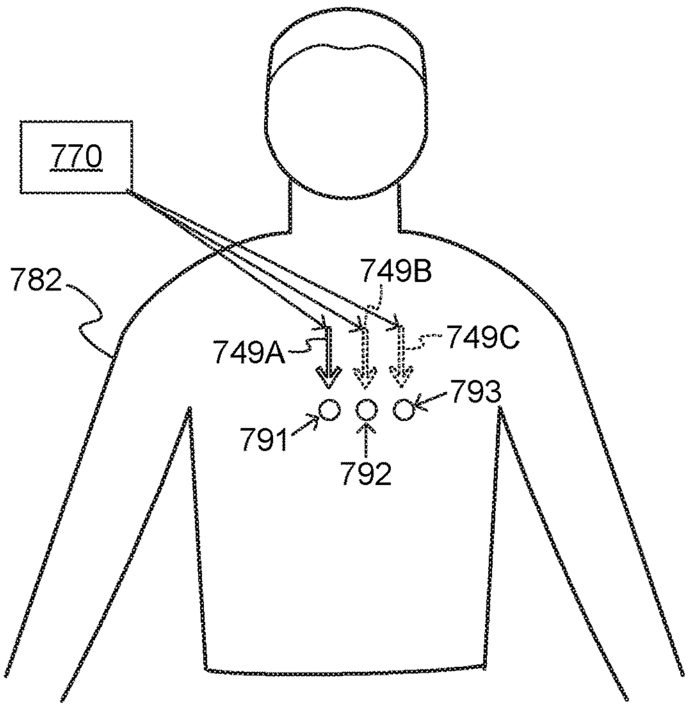
FIG. 6 is a flowchart illustrating methods according to embodiments.
FIG. 7 is a conceptual diagram for indicating that a CPR chest compression machine can perform compressions at different locations on the patient according to embodiments.

FIG. 6 shows a flowchart 600 for describing methods according to embodiments. The methods of flowchart 600 may also be practiced by embodiments described elsewhere in this document for performing automatically a series of successive compressions below the normal level and decompressions alternating with the compressions.

According to an operation 610, a first one of the decompressions in the series is performed to reach a first height above the normal vertical level.

According to another operation 620, a second one of the decompressions in the series is performed to reach a second height, which is less than 80% of the first height above the normal vertical level.

According to another operation 630, a third one of the compressions in the series is performed to reach a third height that is at least as high as the first height above the normal vertical level. The relationships between the heights can be further as described above.

Referring back to FIG. 2, one more way that compressions could differ between different modes according to embodiments is according to changing the exact location of the body at which they are performed. There can be different locations on the chest, which is also called the sternum. Or, the locations could be in the abdomen in addition to the chest. Examples of embodiments are now described.

FIG. 7 is a conceptual diagram showing at least the chest of a patient 782. At least three different locations 791, 792, 793 are indicated on the chest. Locations 791, 792, 793 are indicated by small circles; each can be characterized by a respective center point. It is intended to ultimately perform compressions at these different locations 791, 792, 793 so as to optimize the blood flow for the different modes described above.

Embodiments of a CPR machine also include an adjustment mechanism, which is coupled to the retention structure of the CPR machine that was described above. In FIG. 7 the adjustment mechanism is shown abstractly as element 770, and a person skilled in the art will determine ways of implementing it, in view of the present description and how else the CPR machine of interest is implemented. In embodiments, the adjustment mechanism can be configured to shift the body between at least a first position and a second position with respect to the compression mechanism. There can also be a third position, and so on, as described above for different modes. Shifting positions may be performed while a compression is not being performed.

The different positions of the body with respect to the compression mechanism can advantageously result in the compressions being performed at different locations of the body. To depict the shifting most economically, in the example of FIG. 7 the body is shown as stationary, and adjustment mechanism 770 suggests that the compression mechanism (not shown), is shifted with respect to the body between three different positions so that it can perform compressions at three different locations 791, 792, 793, as shown by arrows 749A, 749B, 749C respectively. Of course, these arrows 749A, 749B, 749C are in the plane of the drawing and not in the direction of movement of, say, a piston embodiment that could be compressing at locations 791, 792, 793 vertically or substantially vertically with respect to the plane of the drawing. Rather, a vertical direction of compressing with respect to the body is illustrated in FIG. 1 by compression mechanism 148 being depicted as an arrow. Plus, as will be seen, the shifting is intended as relative, so for example the body can be shifted with respect to the compression mechanism.

The body can be shifted with respect to the compression mechanism for implementing the different modes of FIG. 2. So, for example at least a first one of the compressions in a series can be performed while the body is at a first position, then at least a second one of the compressions in the series can be performed while the body is at a second position different from the first position, and then at least a third one of the compressions in the series can be performed while the body is at a third position, which can optionally be the first position.

Accordingly, shifting the body with respect to the compression mechanism among the different positions can result in the compressions being performed at different locations 791, 792, 793. Of course, a compression mechanism of the CPR machine of the final implementation such as a piston may have a footprint larger than the circles shown, and such footprints can overlap for the different locations 791, 792, 793. Of course, such overlapping footprints do not eviscerate the notion of shifting to a different point if the overlapping is not exact. For example, in embodiments the compression mechanism can include a contact member configured to make contact with the chest, the contact member can define a footprint of how it contacts the chest, and the footprint can have a center of gravity along substantially two dimensions. In such embodiments, the center of gravity of the footprint by the contact member due to the first compression is at least 0.5" (12 mm) away from the center of gravity of the footprint by the contact member due to the second compression. In fact, that distance can be larger, such as 1" (25 mm), or even farther. The adjustment mechanism is included to effectuate the shifting, so that the locations of the compressions are different.

In one embodiment, the first type of compressions would be similar to those in the prior art, with a force exerted on the lower sternum in the center of the chest. The second type of compressions would exert force at a different position, perhaps 2-3 centimeters to the patient's left of center. This would more likely provide more direct compression of the left ventricle. The system would switch types of compressions every, say, 6 compressions.

Shifting can be performed in any number of ways. In some embodiments shifting is automatic. For example, a controller such as controller 110 can be configured to generate a control signal, and the shifting from one of the first and the second position to the other is performed responsive to the control signal being generated. In other embodiments, instructions such as instructions 132 for individual or a series of compressions are implemented in a memory such as memory 130, and they are read and executed.

In some embodiments shifting is performed by an operator of the CPR machine. For example, a user interface such as user interface 114 can be configured to receive a shift input from an operator, and the shifting from one of the first and the second position to the other is performed in response to the shift input being received.

The shifting by adjustment mechanism 770 can be implemented in any number of ways, by moving different parts with respect to each other. Examples are now described.

In some embodiments the adjustment mechanism is configured to shift where the body is retained with respect to the retention structure. This can be performed in a number of ways. In one example, the retention structure can include a solid portion while the adjustment mechanism includes one or more flexible belts. The belts can shift the patient's body with respect to the solid portion.

Figure 8A:
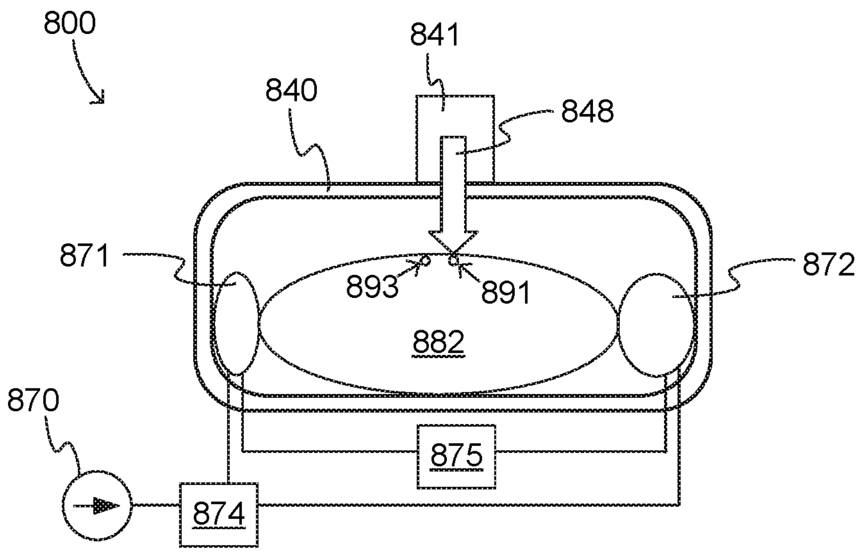
FIG. 8A is a diagram of components of an abstracted CPR chest compression machine compressing while in a first position according to embodiments.
Figure 8B:
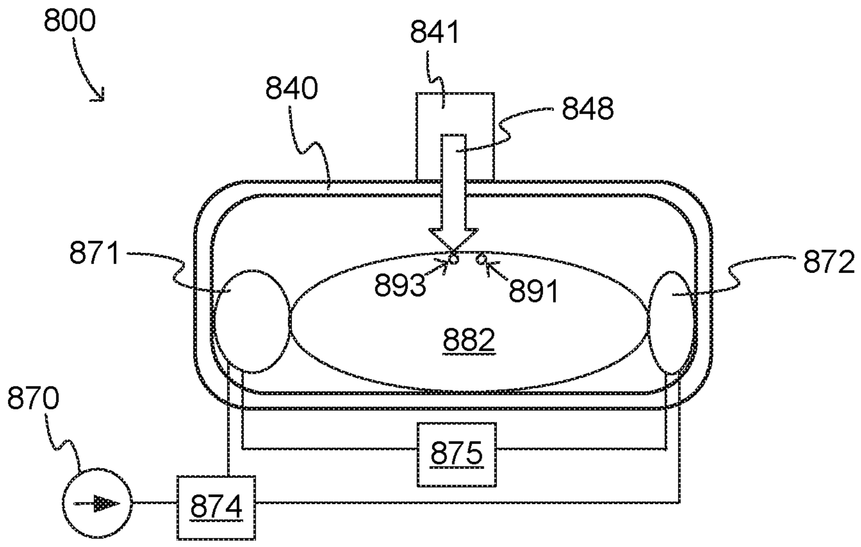
FIG. 8B is a diagram of the components of FIG. 8A compressing while in a second position according to embodiments.

FIGS. 8A and 8B are diagrams of components 800 of an abstracted CPR chest compression machine according to embodiments. They are another example of how the adjustment mechanism can be configured to shift where the body is retained with respect to the retention structure, by including one or more inflatable bladders.

Components 800 include an abstracted retention structure 840, which can be implemented as was written above for retention structure 140. Components 800 also include a compression mechanism 848, which can be implemented as was written above for compression mechanism 148. Components 800 further include a driver 841, which can be implemented as was written above for driver 141.

Patient 882 is retained in retention structure 840. As seen, FIGS. 8A and 8B illustrate patient 882 from the top, with his right side to the right of the drawings. The head of patient 882 is not depicted so as to not clutter the drawing. Two distinct locations 891, 893 on the chest of patient 882 may correspond to locations 791, 793.

In components 800 the adjustment mechanism includes a pump 870, inflatable bladders 871, 872, a switch system 874 and a valve system 875. Air pumped by pump 870 can be steered by switch system 874 to inflate either one of bladders 871, 872, while bladder deflation can be helped by valve system 875. In embodiments, valve system 875 can further steer some of the air from the deflating bladder into the other bladder for a little while, so as to help inflate it. While this is an example of pumping air, another fluid can also be used, for example with the pump operating reversibly.

Operation in two modes could be implemented by alternating between what is shown in FIGS. 8A and 8B. FIG. 8A shows the patient shifted to the first position, with bladder 871 deflated while bladder 872 is inflated. Compressions are thus performed at location 891 of the chest, according to a first mode, while the patient is maintained at the first position by retention structure 840. FIG. 8B shows the patient shifted to the second position which is to the right relative to the first position, with bladder 871 inflated while bladder 872 is deflated. Compressions are thus performed at location 893 of the chest, according to a second mode, while the patient is maintained at the second position by retention structure 840.

The operation of FIGS. 8A and 8B, and in other examples in this description, is shown as taking place at two differing positions. This is done for example and not as a limitation. For example, as applied to FIGS. 8A and 8B, the patient could be also shifted to another position, for example between the first position and the second position. Shifting the patient to the other position may cause the compressions to be performed also at a location other locations 891, 893, for example between them. Similarly with the other examples.

Additional embodiments are now described. For simplicity, the patient is not depicted. Moreover, compression mechanisms are not shown with the suction cup recommended for performing active decompression.

In some embodiments the compression mechanism includes a piston coupled to the retention structure, and a contact member coupled to the piston. In these embodiments, the adjustment mechanism is coupled between the piston and the contact member, and shifting is performed by shifting the contact member with respect to the piston. An example is now described.

Figure 9A:
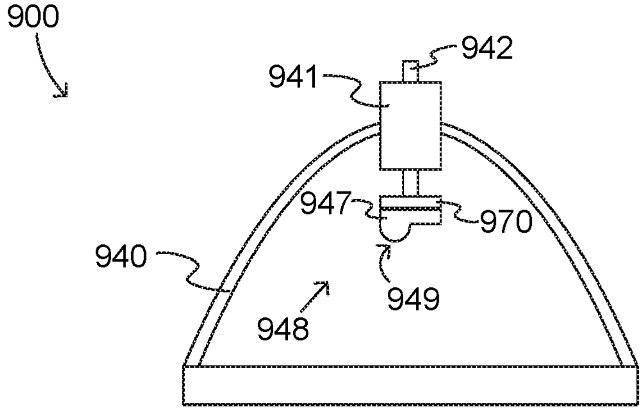
FIG. 9A is a diagram of components of a CPR chest compression machine with a contact member having a protrusion in a first position according to embodiments.
Figure 9B:
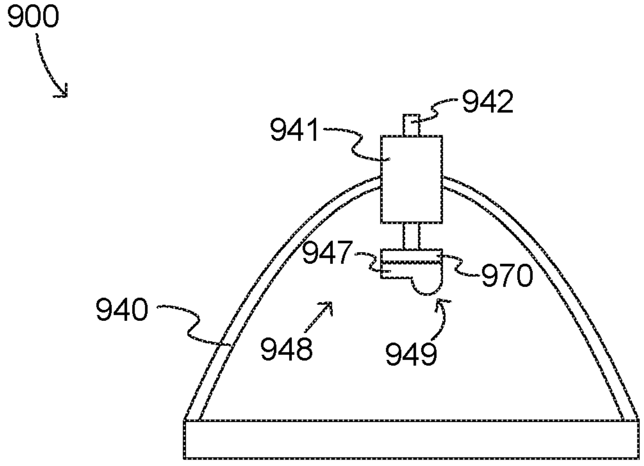
FIG. 9B is a diagram of components of the CPR chest compression machine of FIG. 9A with the protrusion in a second position according to embodiments.

FIGS. 9A and 9B are diagrams of components 900 of an abstracted CPR chest compression machine according to embodiments. Components 900 include an abstracted retention structure 940, which can be implemented as is described in the above-mentioned incorporated U.S. Pat. No. 7,569,021. Components 900 also include a compression mechanism 948, which includes a piston 942 that can be moved up and down, a contact member 947, and adjustment mechanism 970 coupled between piston 942 and contact member 947. It will be appreciated that contact member 947 does not present a flat surface, or a surface of rotational symmetry around an axis of piston 942. Rather, contact member 947 includes an off-center protrusion 949 that performs the compressing and primarily defines the footprint.

Components 900 further include a driver 941, which can be implemented as was written above for driver 141 to drive piston 942 up and down. For example, driver 941 could be implemented by a rack and pinion mechanism.

In components 900, adjustment mechanism 970 includes a disk-shaped portion that is rotatable around an axis parallel to the drawing so as to move protrusion 949 to various positions. As between FIGS. 9A and 9B, the disk-shaped portion has been rotated by 180° so as to move protrusion 949 to different positions, and therefore compress the chest at a different location. Such a compression will be different only preferentially, if protrusion 949 is small compared to the remainder of contact member 947. FIG. 9A shows contact member 947 with protrusion 949 in the first position, while FIG. 9B shows contact member 947 with protrusion 949 in the second position. Operation in two modes could be implemented by alternating between what is shown in FIGS. 9A and 9B. More positions are available by rotating the disk-shaped portion by a different angle.

In the above implementation there can be a small motor for the rotation of the disk of adjustment mechanism 970. Rotation would be performed preferably when not compressing. Wires could reach the motor by traveling through a cavity in piston 942.

If it is known that the position needs to be shifted after every compression, the above described implementation can be performed mechanically instead, without needing a motor. Contact member 947 can instead have just the protrusion, and a switching mechanism can toggle the location of the protrusion as a result of each compression.

The implementation of FIGS. 9A and 9B will have to take into account that, since protrusion 949 is off-center from an axis of piston 942, each compression will exert a force that has a lateral component against piston 942, and thus also against driver 941. This lateral force will have to be absorbed by a sturdier design, or at least reduced by making the whole piston wider and the machine bulkier.

In some embodiments the adjustment mechanism is configured to shift the compression mechanism with respect to the retention structure. An example is now described.

Figure 10A:
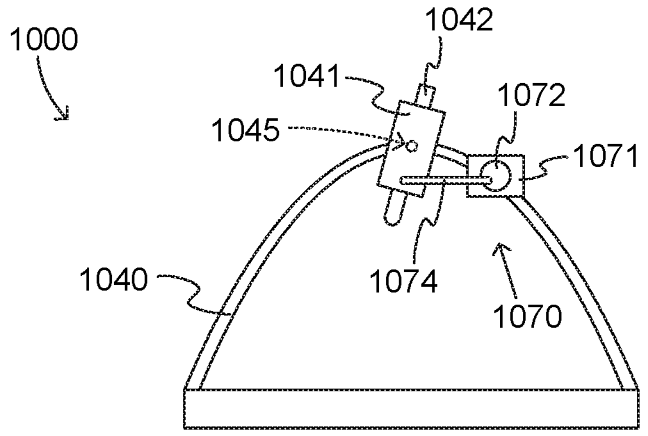
FIG. 10A is a diagram of a CPR chest compression machine in a first position according to embodiments.
Figure 10B:
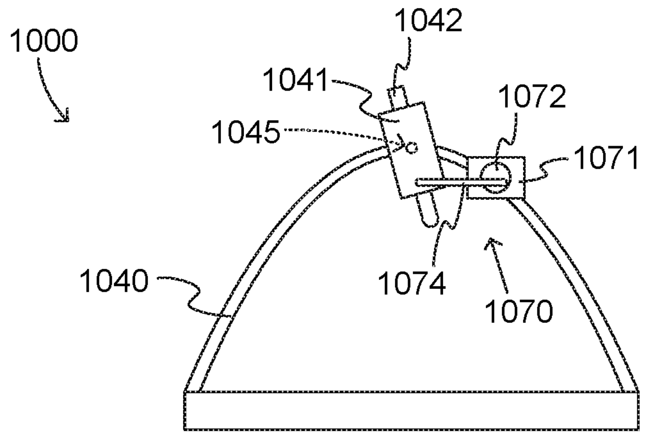
FIG. 10B is a diagram of the CPR chest compression machine of FIG. 10A in a second position according to embodiments.

FIGS. 10A and 10B are diagrams of components 1000 of an abstracted CPR chest compression machine according to embodiments. Components 1000 include an abstracted retention structure 1040, which can be implemented as is described in the above-mentioned incorporated U.S. Pat. No. 7,569,021. Components 1000 also include a compression mechanism that includes a piston 1042 that can be moved up and down. In this example piston 1042 is effectively the compression mechanism, although it is not shown with any special contact member so as not to clutter the drawing. As such, it need not be subject to the type of lateral forces described above.

Components 1000 further include a driver 1041, which can be implemented as was written above for driver 141 to drive piston 1042 up and down. For example, driver 1041 could be implemented by a rack and pinion mechanism.

Driver 1041 and thus also piston 1042 are suspended on a short axle 1045 that has an axis vertical to the drawing. Driver 1041 is thus rotatable around axle 1045, and therefore piston 1042 can compress the chest at different locations. An adjustment mechanism 1070 controls the rotation of driver 1041 around axle 1045. More particularly, adjustment mechanism 1070 includes a base 1071 coupled to retention structure 1040, and a disk 1072 on base 1071 that is rotatable around an axis perpendicular to the drawing. An elongate member 1074 is coupled to disk 1072 and to driver 1041 via joints. As between FIGS. 10A and 10B, disk 1072 has been rotated by approximately 120° so as to cause elongate member 1074 to move driver 1041 to a different position. FIG. 10A shows piston 1042 in the first position, while FIG. 10B shows piston 1042 in the second position. Operation in two modes could be implemented by alternating between what is shown in FIGS. 10A and 10B. More positions are available by rotating disk 1072 by a different angle.

The implementation of FIGS. 10A and 10B will have to take into account the fact that the forces due to compression will be applied also against axle 1045. Moreover, moving parts like disk 1072 and elongate member 1074 are better off not exposed to the user for safety purposes, and a shroud could be added.

Figure 11:
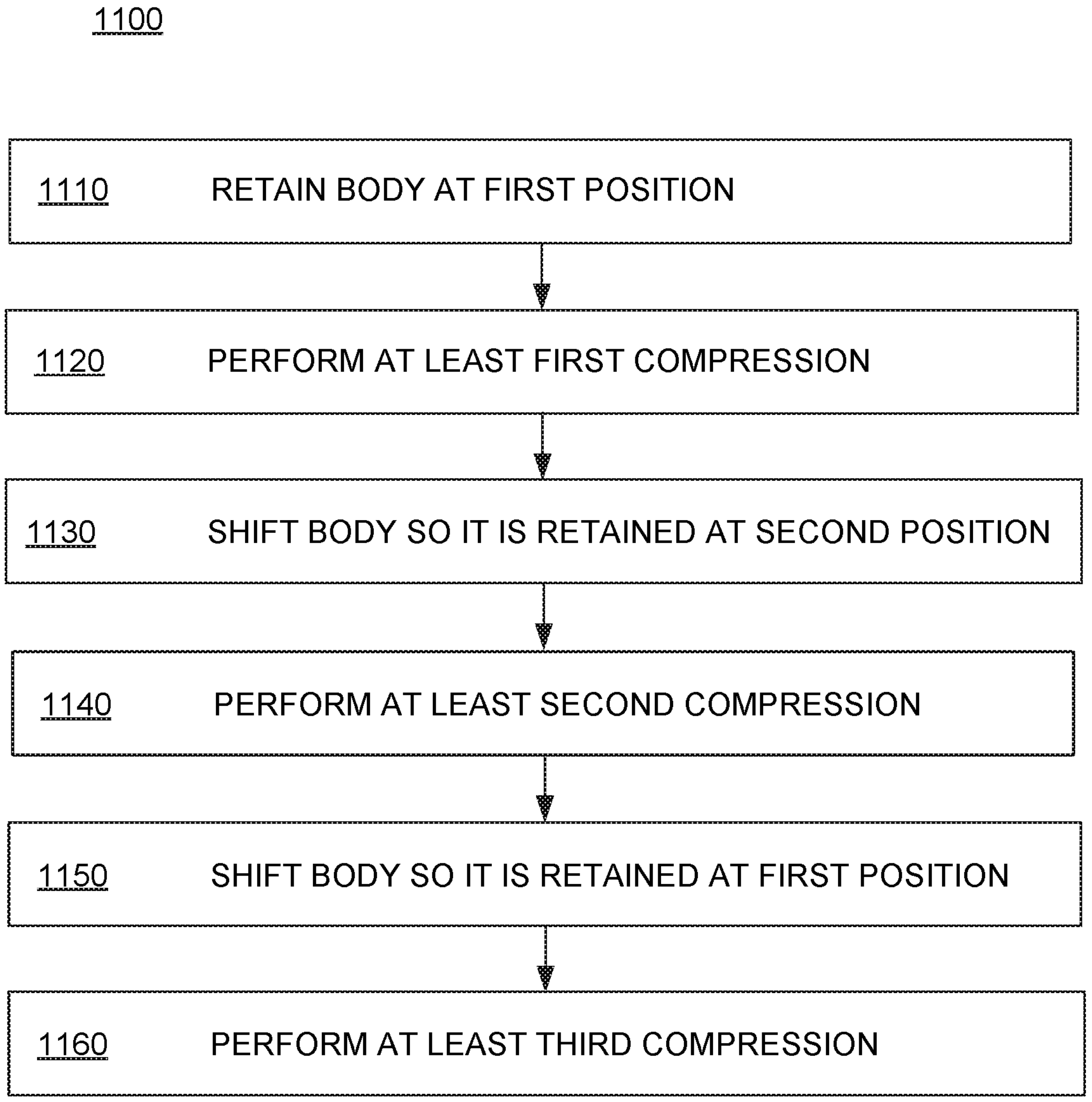
FIG. 11 is a flowchart illustrating methods according to embodiments.

FIG. 11 shows a flowchart 1100 for describing methods according to embodiments. The methods of flowchart 1100 may also be practiced by embodiments described elsewhere in this document so as to perform or cause to be performed automatically a series of successive compressions to a chest of a patient.

According to an operation 1110, a body of the patient is retained at a first position with respect to a compression mechanism.

According to another operation 1120, at least a first one of the compressions is performed while the body is maintained at the first position.

According to another operation 1130, the body is then shifted so that it is retained at a second position with respect to the compression mechanism.

According to another operation 1140, at least a second one of the compressions is performed while the body is maintained at the second position.

According to another operation 1150, the body is then shifted so that it is retained at the first position with respect to the compression mechanism.

According to another operation 1160, at least a third one of the compressions is performed while the body is maintained at the first position.

The above mentioned modes could also vary in terms of ventilation. For instance, the mode of ventilating could be changed back and forth between two modes. So for example, a period with no ventilations could be alternated with a period of multiple relatively quick breaths. This could work with standard airway, such as an endotracheal tube. For special situations, such as using a Boussignac tube and continuous oxygen insufflation through that tube, the flow of oxygen through the tube could be turned on and off for the two different modes. Likewise, if applying jet ventilation through a tube, that jet ventilation could be turned on and off to get the two different modes to alternate between.

In embodiments, a change in ventilation could be made at the time of (or a time offset be a known amount from) the change from one mode of compressions to another. For example, a positive pressure breath would be administered just as the compressions switch from type 1 to type 2; this would help squeeze blood volume out of the pulmonary vasculature into the left heart. The device could prompt for delivery of the breath at that time or, if it was a combined Chest Compression device/ventilator, it could automatically deliver the breath then. Alternatively, the breath could be delivered 1-3 compressions before changing to type 2 compressions. To summarize, possible ventilation related variables include the mode of ventilation, the ventilatory flow of gases, the operation of valves that regulate the flow of gases, and the amount of resistance added to the airway (to inhibit inflow or outflow of gases) (for example, for an impedance threshold device, turn on and off its ability to resist inflow during chest release).

In the methods described above, each operation can be performed as an affirmative step of doing, or causing to happen, what is written that can take place. Such doing or causing to happen can be by the whole system or device, or just one or more components of it. In addition, the order of operations is not constrained to what is shown, and different orders may be possible according to different embodiments. Moreover, in certain embodiments, new operations may be added, or individual operations may be modified or deleted. The added operations can be, for example, from what is mentioned while primarily describing a different system, apparatus, device or method.

Returning to FIG. 1, components 100 can be augmented with a sensor (not shown) for sensing a physiological parameter of patient 182. The physiological parameter can be an Arterial Systolic Blood Pressure (ABSP), a blood oxygen saturation (SpO2), a ventilation measured as End-Tidal CO2 (ETCO2), a temperature, a detected pulse, etc. In addition, this parameter can be what is detected by defibrillator electrodes that may be attached to patient 182, such as ECG and impedance. The sensor can be implemented either on the same device as controller 110 or not, and so on.

Upon sensing the physiological parameter, a value of it can be transmitted to controller 110, as is suggested via arrow 119. Transmission can be wired or wireless.

Controller 110 may further optionally aggregate resuscitation data, for transmission to a post processing module 190. The resuscitation data can include what is learned via arrow 119, time data, etc. Transmission can be performed in many ways, as will be known to a person skilled in the art. In addition, controller 110 can transmit status data of the CPR chest compression machine that includes retention structure 140.

A person skilled in the art will be able to practice the present invention in view of this description, which is to be taken as a whole. Details have been included to provide a thorough understanding. In other instances, well-known aspects have not been described, in order to not obscure unnecessarily the present invention. Plus, any reference to any prior art in this description is not, and should not be taken as, an acknowledgement or any form of suggestion that this prior art forms parts of the common general knowledge in any country.

This description includes one or more examples, but that does not limit how the invention may be practiced. Indeed, examples or embodiments of the invention may be practiced according to what is described, or yet differently, and also in conjunction with other present or future technologies. Other embodiments include combinations and subcombinations of features described herein, including for example, embodiments that are equivalent to: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and subcombinations.

In this document, the phrases "constructed to" and/or "configured to" denote one or more actual states of construction and/or configuration that is fundamentally tied to physical characteristics of the element or feature preceding these phrases. This element or feature can be implemented in any number of ways, as will be apparent to a person skilled in the art after reviewing the present disclosure, beyond any examples shown in this example.

The following claims define certain combinations and subcombinations of elements, features and steps or operations, which are regarded as novel and non-obvious. Additional claims for other such combinations and subcombinations may be presented in this or a related document. When used in the claims, the phrases "constructed to" and/or "configured to" reach well beyond merely describing an intended use, since such claims actively recite an actual state of construction and/or configuration based upon described and claimed structure.

What is claimed is:

1. A Cardio-Pulmonary Resuscitation ("CPR") device for compressing and decompressing a chest of a patient that has a neutral position when the CPR device is neither compressing nor decompressing, the CPR device comprising:

a compression mechanism configured to pull the chest of the patient away from the neutral position; and a driver configured to drive the compression mechanism to cause the compression mechanism to enter a first mode and pull the chest of the patient a first distance away from the neutral position during a first decompression for a first duration, to enter a second mode when the first duration has elapsed and pull the chest of the patient a second distance less than the first distance away from the neutral position during a second decompression for a second duration, and to enter a third mode when the second duration has elapsed and pull the chest a third distance greater than the first distance away from the neutral position during a third decompression, wherein the first mode, the second mode, and the third mode are sequential.

2. The CPR device of claim 1, wherein the second distance is less than 80% of the first distance.

3. The CPR device of claim 1, wherein the second distance is less than 30% of the first distance.

4. The CPR device of claim 1, wherein the second distance is substantially zero.

5. The CPR device of claim 1, wherein the compression mechanism is further configured to alternatingly compress the chest of the patient beyond the neutral position and pull the chest of the patient away from the neutral position.

6. The CPR device of claim 5, wherein the driver is further configured to drive the compression mechanism to cause the compression mechanism to compress the chest of the patient to a first depth beyond the neutral position during a first compression and to compress the chest of the patient to a second depth deeper than the first depth beyond the neutral position during a second compression.

7. A method for compressing and decompressing a chest of a patient with a Cardio-Pulmonary Resuscitation ("CPR") device that has a neutral position when the CPR device is neither compressing nor decompressing, comprising:
- pulling the chest of the patient a first distance away from the neutral position during a first decompression in a first mode lasting a first duration;
- pulling the chest of the patient, when the first duration has elapsed, a second distance less than the first distance away from the neutral position during a second decompression in a second mode lasting a second duration; and
- pulling the chest a third distance, when the second duration has elapsed, greater than the first distance away from the neutral position during a third decompression in a third mode lasting a third duration, wherein the first mode, the second mode, and the third mode are sequential.

8. The method of claim 7, wherein the second distance is less than 80% of the first distance.

9. The method of claim 7, wherein the second distance is less than 30% of the first distance.

10. The method of claim 7, wherein the second distance is substantially zero.

11. The method of claim 7, further comprising alternatingly compressing the chest of the patient below the neutral position and lifting the chest of the patient away from the neutral position.

12. The method of claim 11, further comprising:
- compressing the chest of the patient to a first depth beyond the neutral position during a first compression; and
- compressing the chest of the patient to a second depth deeper than the first depth beyond the neutral position during a second compression.

13. A non-transitory storage medium having stored thereon instructions which, when executed by a Cardio-Pulmonary Resuscitation ("CPR") compression machine, cause the CPR compression machine to:
- enter a first mode and pull a chest of a patient a first distance away from a neutral position during a first decompression for a first duration;
- enter a second mode when the first duration has elapsed and pull the chest of the patient a second distance less than the first distance away from the neutral position during a second decompression for a second duration; and
- enter a third mode when the second duration has elapsed and pull the chest a third distance greater than the first distance away from the neutral position during a third decompression for a third duration, wherein the first mode, the second mode, and the third mode are sequential.

14. The non-transitory storage medium of claim 13, wherein the second distance is less than 80% of the first distance.

15. The non-transitory storage medium of claim 13, wherein the second distance is less than 30% of the first distance.

16. The non-transitory storage medium of claim 13, wherein the second distance is substantially zero.

17. The non-transitory storage medium of claim 13, further comprising instructions which cause the CPR compression machine to alternatingly compress the chest of the patient beyond the neutral position and pull the chest of the patient away from the neutral position.

* * * * *